United States Patent
Joyce et al.

(10) Patent No.: US 8,447,873 B1
(45) Date of Patent: May 21, 2013

(54) MANAGING OBJECT MODEL COMMUNICATIONS

(75) Inventors: Scott E. Joyce, Foxborough, MA (US); Norman M. Miles, Bedford, MA (US); Pauline Boyong Chen, North Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 154 days.

(21) Appl. No.: 13/172,144

(22) Filed: Jun. 29, 2011

(51) Int. Cl.
*G06F 15/16* (2006.01)
*G06F 15/173* (2006.01)

(52) U.S. Cl.
USPC ............ 709/230; 709/203; 709/223; 709/224

(58) Field of Classification Search
USPC ................ 709/203, 223, 224, 230, 232, 238, 709/246; 707/10
See application file for complete search history.

(56) References Cited

U.S. PATENT DOCUMENTS

| | | | |
|---|---|---|---|
| 7,047,318 B1 * | 5/2006 | Svedloff | 709/223 |
| 2003/0131051 A1 * | 7/2003 | Lection et al. | 709/203 |
| 2009/0216775 A1 * | 8/2009 | Ratliff et al. | 707/10 |
| 2010/0030852 A1 * | 2/2010 | Kerebel et al. | 709/203 |
| 2010/0114993 A1 * | 5/2010 | Holschbach et al. | 707/810 |

* cited by examiner

*Primary Examiner* — Quang N Nguyen
(74) *Attorney, Agent, or Firm* — Krishnendu Gupta; Jason A. Reyes

(57) ABSTRACT

A method and system are used in managing object model communications. In a Flex operating environment, an information set is received conforming to an object model representation. A client side normalization is performed in the flex operating environment on the information to derive another information set conforming to another object model representation. Based on the other object model representation, a dialog is generated that is sufficient for legacy and current object models of Flex and Java operating environments having network communications with data storage systems.

16 Claims, 4 Drawing Sheets

Viewblock with Flat Table

Sample Table Panel with Simple Flat Table

Filter for

| ID | RAID Type | Number of LUNs |
|---|---|---|
| 0 | 1 | 4 |
| | | |
| | | |

FIG. 4

MANAGING OBJECT MODEL COMMUNICATIONS

BACKGROUND

1. Field of the Invention

The present invention relates to managing object model communications.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

A typical computer network being used today that can run object oriented software is a client-server network, the client being the user (GUI) or workstation and the server being software (discrete or distributed throughout the network) which serves the client. In this network, a computer system can employ one or more object-oriented computer languages such as C++, XML (eXtensible Markup Language), Java, Flash, and/or others. Briefly, an object, in computer software terms, is a dedicated area of memory which can be thought of as an impervious container holding both data and instructions within itself, both defining itself and its relationships to other objects in the computer system or network. Such object or node can send and receive messages to and from other objects, respond and react to such messages (e.g. commands) but shall normally be impervious to internal scrutiny. For example, in a computer data storage system (a kind of computer) each object (system object) may describe or relate to a specific tangible detail in the storage system or in the storage system's processor (e.g., details such as those describing or relating to aspects of operation of the processor's cooling-fan, power switch, cache memory, power supply, disk drive interface, individual disks, etc.).

With respect to networks, people today use the World Wide Web for a variety of different and diverse tasks for example locating information, ordering and buying goods on-line and managing their finances. Many users expect that these applications will operate regardless of what type of computer platform is used.

Java technology, which is a trademark of Sun Microsystems, Inc, helps provide a solution by allowing the creation of computer platform independent programs. The Java technology includes an object oriented programming language and a platform on which to run the Java applications (known as Java Runtime Environment or JRE). Java is both a compiled and an interpreted language. The source code that has been written by the application developer is compiled into an intermediate form called a Java bytecode, which is a platform independent language. At a client machine, the java bytecodes are interpreted by the Java platform and the Java interpreter parses and runs each Java bytecode instruction on the computer. (If the Java bytecode is run as a applet, it may first be sent over the network to the client machine.)

Java's objected oriented programming language is based on using objects and classes and this paragraph will introduce the reader to a few basic concepts. Just like real world objects, software objects consist of a state and a behavior. A software object maintains its state in one or more variables and a variable is an item of data named by an identifier. A software object implements its behavior with methods and a method is a function associated with an object. Just like any other objected oriented programming language objects communicate with each other by passing messages. Further object oriented concepts are well known in the art and will not be described here further.

The Java platform includes the Application Programming Interface (API), which is a large collection of ready-made software components, which provide a variety of capabilities, and the Java Virtual Machine (JVM) which will be explained in the paragraph below. Together the JVM and the API sit on top of the hardware based computer platform and provide a layer of abstraction between the Java program and the underlying hardware.

The JVM is made up of software, which can run a Java program on a specific computer platform of a client machine. Before a Java program can be run on a JVM, the Java program must first be translated into a format that the JVM recognizes, which is called a Java class file format. The Java class file format contains all the information needed by a Java runtime system to define a single Java class.

Adobe Flex is a collection of technologies released by Adobe Systems for the development and deployment of cross platform rich Internet applications based on the Adobe Flash platform. Flex provides a workflow and programming model that is familiar to developers. Macromedia XML ("MXML"), an eXtensible Markup Language ("XML")-based markup language, offers a way to build and lay out graphic user interfaces. Interactivity is achieved through the use of ActionScript, the core language of Flash Player that is based on the European Computer Manufacturers Association ("ECMA") ECMAScript standard. A Flex software development kit ("SDK") comes with a set of user interface components including buttons, list boxes, trees, data grids, several text controls, charts, graphs and various layout containers. Other features such as web services, drag and drop, modal dialogs, animation effects, application states, form validation, and other interactions round out the application framework.

A Flex application may be a rich internet application ("RIA"). RIAs introduce an intermediate layer of code, often called a client engine, between the user and the server. This client engine is typically downloaded as part of the instantiation of the application, and may be supplemented by further code downloads as use of the application progresses. The client engine acts as an extension of the browser, and usually takes over responsibility for rendering the application's user interface and for server communication. What can be done in a RIA may be limited by the capabilities of the system used on the client, but in general, the client engine is programmed to perform application functions that its designer believes will enhance some aspect of the user interface, or improve its responsiveness when handling certain user interactions, compared to a standard Web browser implementation. Also, while simply adding a client engine does not force an application to depart from the normal synchronous pattern of interactions between browser and server, in most RIAs the client engine performs additional asynchronous communications with servers.

In a multi-tiered model, Flex applications serve as the presentation tier. Unlike page-based Hypertext Markup Language ("HTML") applications, Flex applications provide a stateful client where significant changes to the view don't require loading a new page. Similarly, Flex and Flash Player provide many useful ways to send and load data to and from server-side components without requiring the client to reload the view. To incorporate a Flex application into a website, one typically embeds Shockwave Flash (.SWF) file in an HTML, JavaServer Pages ("JSP"), Adobe, ColdFusion, or other type of web page. The page that embeds the SWF file is known as the wrapper. A wrapper consists of an <object> tag and an <embed> tag that format the SWF file on the page, define data object locations, and pass run-time variables to the SWF file. In addition, the wrapper can include support for history management and Flash Player version detection and deployment.

It is possible for a Flex application to be launched from one domain and then connect back to a different domain by installing a cross domain policy file in a site.

An object, in computer software terms, is a dedicated area of memory which can be thought of as an impervious container holding both data and instructions within itself, both defining itself and its relationships to other objects in the computer system or network. An object can send and receive messages to and from other objects, respond and react to such messages (e.g., commands) but shall normally be impervious to internal scrutiny. For example, in a storage processor (a kind of computer) each object may describe or relate to a specific detail in the processor (e.g. a fan, power switch, cache memory, power supply, disk drive interface, etc.), where these tangible objects in the storage processor can send messages to each other and to other objects outside the processor. The relationship between these specific objects in the storage processor is usually visualized or characterized as a "tree" of objects. In a tree, each such object hangs off a preceding object as if in a parent-child or inheritance relationship, with many children hanging from a parent not being an atypical configuration. In addition to these tangible kinds of objects, logical units are other nodes or objects that can be contained within the tree.

The common information model (CIM) is an open standard from the Distributed Management Task Force (DMTF) that manages systems and networks. CIM defines a set of classes with properties and associations which in turn provide a conceptual framework applicable to all areas of management including systems, applications, databases, networks, and devices. The framework enables the organization of data for a specific managed environment.

An implementation of CIM, known as common information model object manager (CIMOM), takes the form of a CIM server that receives, validates, and authenticates client application requests. CIMOM directs the requests to the appropriate functional component or to an application provider. In addition, CIMOM provides a repository for storage of management data.

Applications that are employed to enable users to access information typically employ a user interface that is specifically designed to enable a user to selectively display data about a subject from among different categories of information. Since an application typically defines the specific appearance of each user interface, the content that can be accessed using control buttons, menus, and other interface elements in each user interface of the application will normally be statically defined when the application is released for distribution. The constraints imposed by a user interface that is statically defined will thus preclude making changes in the information content that can be selected with controls in the user interface after the application is distributed. For example, if at the time an application was released for distribution, it included a user interface that enabled users to select from among five different sources of information, it would typically be necessary to rewrite the code that defines the user interface to enable users to access additional sources of information that later become available. Typically, an update of the application would have to be written and released for installation by users. Specifically, the user interface would need to be changed to include control buttons or other control elements for selectively accessing the additional information sources. Furthermore, each time that additional information sources are added, yet another update of the application with a rewritten and revised user interface must be manually written and released for installation by the user of the application. Clearly, for applications in which the content or information that is accessed by selections made in a user interface changes frequently, the need to continually modify the user interface to enable selection of the changing content creates a substantial challenge, because the cost of updating the applications with each new user interface represents a significant overhead.

A related challenge exists in applications that are "localized" for release in different languages and cultures. The customization of different versions of a software application to provide appropriate user interfaces for each different language and/or culture is referred to as "localization." The localization of the user interfaces in an application will typically require that each control button or other control elements within the user interfaces of the application be provided in the language of the region in which that version of the application will be released.

An application may be developed using a model view presenter (MVP) design pattern.

SUMMARY OF THE INVENTION

A method and system are used in managing object model communications. In a Flex operating environment, an information set is received conforming to an object model representation. A client side normalization is performed in the flex operating environment on the information to derive another information set conforming to another object model representation. Based on the other object model representation, a dialog is generated that is sufficient for legacy and current object models of Flex and Java operating environments having network communications with data storage systems.

BRIEF DESCRIPTION OF THE DRAWINGS

Features and advantages of the present invention will become more apparent from the following detailed description of exemplary embodiments thereof taken in conjunction with the accompanying drawings in which:

FIGS. 2, 4 are illustrations of user interface screens and content that may be used with the technique herein.

DESCRIPTION OF EMBODIMENT(S)

Described below is a technique for use in managing object model communications. In at least one implementation, the technique may be used to help provide data normalization for backward compatibility and localization. At least one implementation using the technique takes multiple object model representations and performs a client side normalization in order to generate dialogs that will work for legacy and current object models. Depending on the implementation, information may be received in different formats such as EMC Navisphere ("Navi") CIM/XML, standard CIM/XML, BAM/XML, and may be decoded into a object model that can be used generically by dialogs. Accordingly, this also allows a system to localize content using normalized object model property files.

Figure 1:
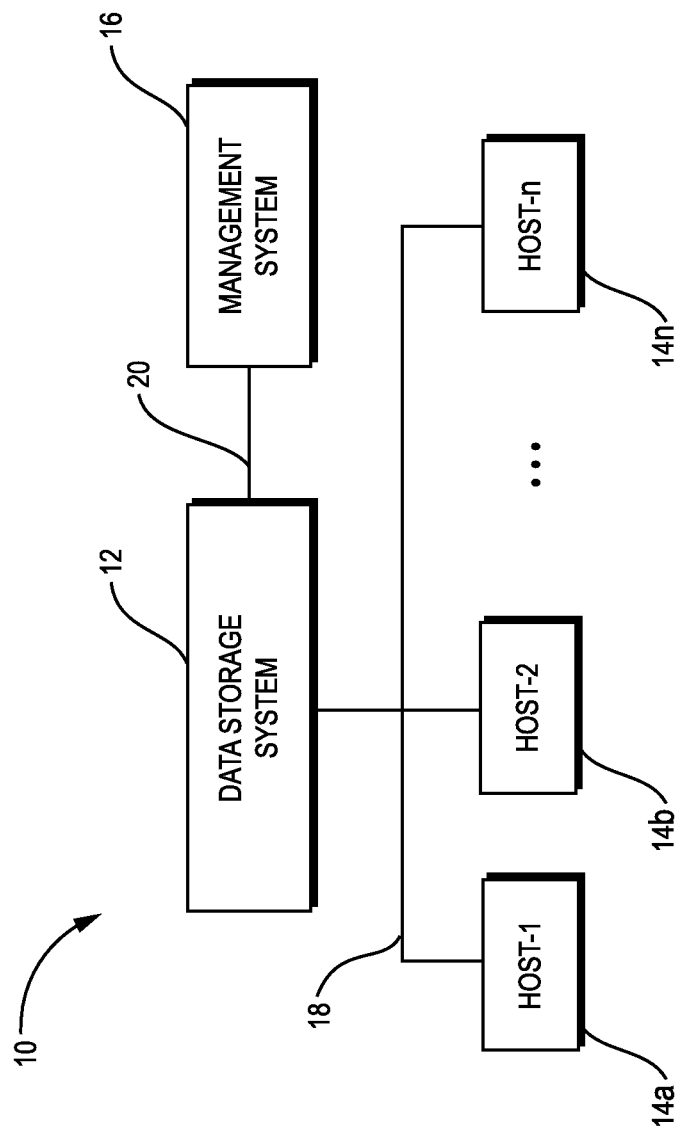
FIGS. 1, 3 are illustrations of systems that may be used with the technique herein.

Referring now to FIG. 1, shown is an example of an embodiment of a computer system that may be used in connection with performing the technique described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the computer system 10. In one embodiment, the communication medium 20 may be any medium that can support TCIP/IP (e.g., a LAN connection) and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Figure 2:
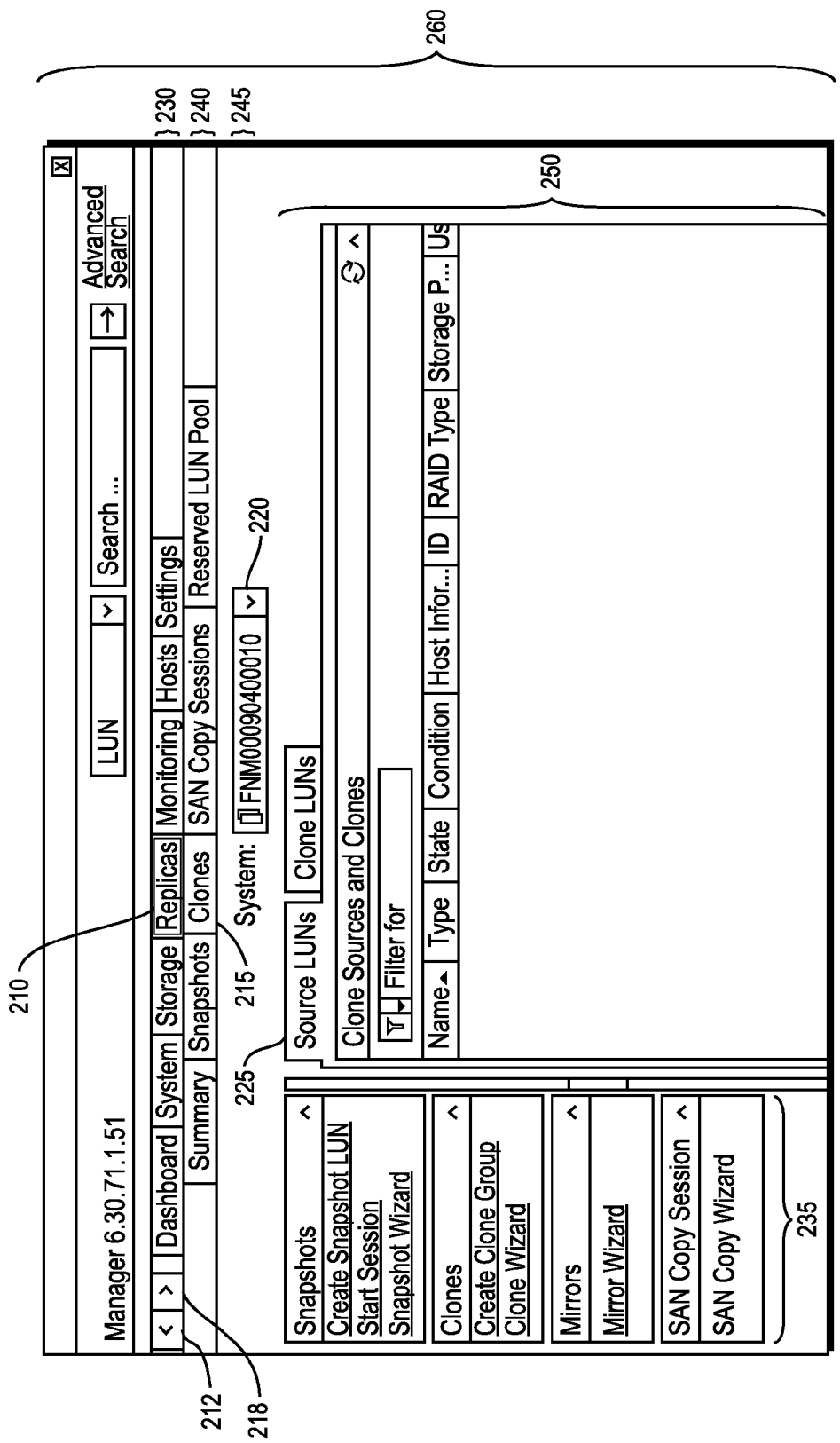

Referring now to FIG. 2, shown is an example of a GUI 260 that may be used in connection with the technique described herein and that may be included in the management system 16. As shown, GUI 260 has a section panel 230 that has buttons including REPLICAS button 210 and a backward navigation button 212 and a forward navigation button 218. GUI 260 also has s subsection panel 240 that has buttons including CLONES button 215. A system selection area 245 of GUI 260 has a system selection pulldown menu 220. GUI 260 also has a links table 235 and main body area 250 that has tabs including tab 225.

Figure 3:
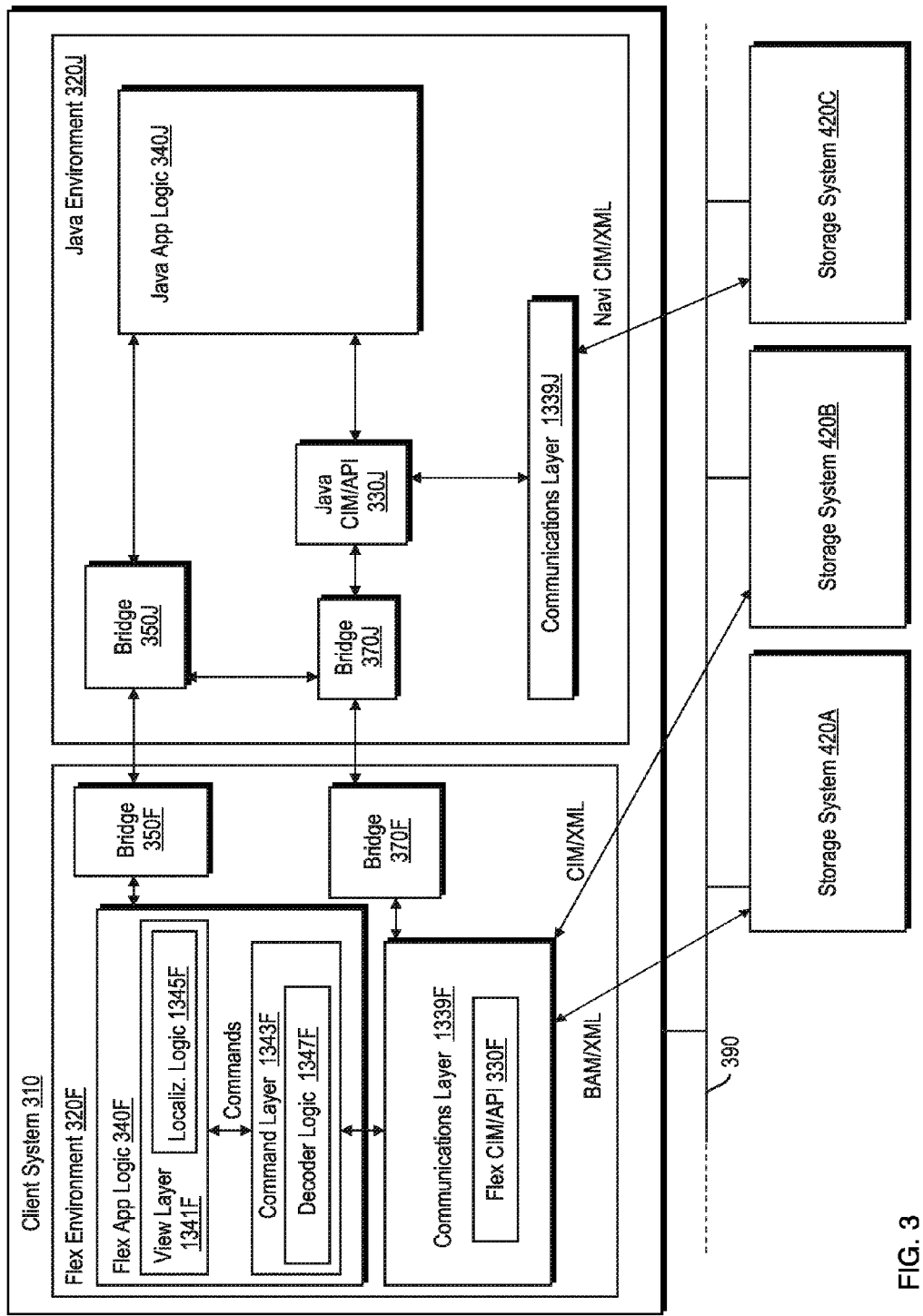

FIG. 3 illustrates details of an implementation example that uses the technique, and that may be used in producing and/or controlling GUI 260. Client system 310 (e.g., a computer running a Web browser) may be, include, or be included in management system 16, and may be used in producing GUI 260, one or more of storage systems 420A, 420B, 420C may be, include, or be included in data storage systems 12, and network 390 may be, include, or be included in communication medium 20.

System 310 has Flex operating environment 320F and Java operating environment 320J, which includes the JRE. Flex application logic 340F, bridges 350F, 370F, 350J, 370J, Flex logic 1345F, 1347F, layers 1341F, 1343F, 1339F, CIM/API 330F, Java application logic 340J, Java CIM/API 330J, and communications layer 1339J are elements that are not included in environments 320F, 320J respectively but that execute and/or are used on environments 320F, 320J as described below.

Flex environment 320F and elements used on environment 320F are used directly to produce GUI 260. Java environment 320J and elements used on environment 320J are used directly to support production of GUI 260.

On startup, system 310 loads Flex environment 320F and elements used on environment 320F, and Java environment 320J and elements used on environment 320J, for use in communicating with, e.g., storage systems 420A, 420B, 420C. For example, if the user uses system selection pulldown menu 220 to select system 420C, system 310 may rely on Java environment 320J and elements used on environment 320J to communicate with system 420C to retrieve status and/or configuration information about system 420C to help fill out main body area 250 for system 420C.

Bridges 350F, 350J and/or bridges 370F, 370J establish a socket connection. (Sockets are supported by both environments 320F, 320J, but in at least one embodiment, environment 320F does not support server sockets, so inter-environment communications relies on a message identifier system to match requests with responses.) The socket connection using bridges 350F, 350J and/or bridges 370F, 370J can be used to pass messages between environments 320F and 320J, wherein respective message queues are provided where messages bound for the other environment may be held temporarily awaiting their turns.

In the example system of FIG. 3, logic 340F includes view layer 1341F and command layer 1343F. Layer 1341F has a model view presenter (MVP) design pattern and relies on information retrieved through layer 1343F and layer 1339F about one or more of systems 420A, 420B, 420C. Layer 1341F issues generic commands to layer 1343F, which derives nongeneric commands from the generic commands and directs the nongeneric commands through layer 1339F. When layer 1343F receives responses through layer 1339F, layer 1343F uses decoder logic 1347F to derive generic format information from such responses, and makes such generic format information available to layer 1341F. In at least some implementations, layer 1341F uses localization logic 1345F to derive localized generic format information from such generic format information.

In general, in accordance with the technique described herein, system 310 has enhancements relating converging a lot of content, getting different protocols and different object models, and converging object models, dealing with backward compatibility, making object models, and regenerating new reusable content that accepts output from the system's views. It is preferable to avoid tying views to object models that are changing, but views also need to work with old legacy object models as well as new object models and content that is changing. In general, the technique described herein allows the system to manage these enhancements in a client environment, while adhering to existing localization models. Content is retrieved from different areas and is exposed in a common way in a client environment to allow reusable views on the common data and reuse of existing localization models.

Layer 1341F needs a certain set of commands to get its work done, which commands are defined as generic commands which define information that is needed by corresponding views. Layer 1343F defines different implementations of such generic commands that implement those generic commands as nongeneric commands in a way that the nongeneric commands get the data from, for example, different protocols, different revisions of storage systems, and different APIs. As illustrated by example in FIG. 3, layers 1343F, 1339F may get such data/command from, for example, a Java environment, a Flex/Java environment, legacy content, BAM protocol, CIM/XML, Navi CIM/XML. Layer 1343F normalizes the data in a way that it can be exposed to views in a common way, so that layer 1341F can localize appropriately, and the system is ready for changes as time goes on.

For example, a Flex decoder may work well with XML to pull up properties in a known format, and apply it to a view. The Flex decoder may take a well known XML format, decodes it into an object model and other structures and apply them to the view. Different decoders may be provided so that different protocols and object model structures can be decoded into a normalized model that can be applied to layer 1341F. Once the normalized model is available, localization content can be applied to the normalized model as opposed to applying such content to different object models. Also, the normalized model can serve as a new client based object model for future programming, while also taking legacy content and making it appear in the new model so that views can handle new and legacy content in one common way.

In at least some implementations, protocol is removed or reduced as a factor so that multiple protocols and multiple object models are normalized by using corresponding decoder logic.

Once a command is issued making requests, the system is aware of which decoder logic to use, based on the characteristics of the particular storage system or systems, to parse responsive data, and put such data in the same format regardless of the particular system or systems. Normalization is provided in both directions, with commands and responses, depending on action required. For example, a user may make a drop down box selection, and logic 340F may put such selection into passive parameters that the normalized object model is aware of.

In general, layer 1339F makes a request to a storage system and returns data to layer 1343F to determine the object model into which to parse the data. In at least some implementations, logic 1347F is particularly useful and efficient for communicating with Java-access systems, because logic 1347F can parse data returned from such systems instead of requiring environment 320J to parse such data and maintain and populate its own object models as a result, which consumes resources. Java-access systems are storage systems such as system 420C wherein system 310 must rely on Java environment 320J and elements used on environment 320J to communicate with such system 420C. In the case of Java-access systems, any communication that Flex environment 320F and elements used on environment 320F require with such systems must be routed through Java environment 320J, so that, for example, Java environment 320J retrieves information from system 420C and provides such information to Flex environment 320F so that elements used on environment 320F can help fill out main body area 250 for system 420C.

In an example, an existing implementation has many Java based resources available to be leveraged by Flex environment 320F and elements used on environment 320F, which resources are made available through logic 340J. In general, such resources are from or are derived from an existing Java-based user interface system, and help Flex environment 320F and elements used on environment 320F to communicate with Java-access systems to produce GUI 260.

In at least some cases, environment 320F makes use of such Java based resources by using logic 340F or layer 1339F to make a request to logic 340J. For example, environment 320F may display in GUI 260 a page about LUNs or disks, and the user may click on a button on such page. In such a case, the request includes an RPC made to Java logic 340J. If necessary to fulfill the request, Java logic 340J retrieves information from system 420C.

In at least some cases in which client system 310 needs to communicate with only one storage system, e.g., system 420A, client 310 does not need to include environment 320J or logic 340J at all, and can communicate directly between environment 320F and system 420A using standard browser and/or Flex facilities.

Each component described herein may be a means for performing the functions described. Each components described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing object model communications, the method comprising:

requesting, in a Flex operating environment, an information set conforming to an object model representation from a data storage system;

receiving, in the Flex operating environment, the information set conforming to the object model representation;

performing, in the Flex operating environment, a client side normalization on the received information set to derive another information set conforming to another object model representation; and based on the other object model representation, generating a dialog that is sufficient for legacy and current object models of Flex and Java operating environments having network communications with data storage systems;

wherein requesting comprises issuing generic commands defining information required by corresponding views, decoding the generic commands and implementing the generic commands as non-generic commands such that the non-generic commands can retrieve the data from different protocols, different data storage systems and different Application Programming Interfaces (APIs).

2. The method as claimed in claim 1, wherein receiving, in the Flex operating environment, information conforming to the object model representation in different formats selected from the group consisting of:

EMC Navisphere ("Navi") CIM/XML
standard CIM/XML
BAM/XML.

3. The method as claimed in claim 1, further comprising:
providing communication between the Flex operating environment and a second discrete operating environment.

4. The method as claimed in claim 3, wherein the second operating environment is a Java operating environment.

5. The method as claimed in claim 3, further comprising:
allowing routing information from storage system through second operating environment so that the information is received in the Flex operating environment.

6. The method as claimed in claim 1, further comprising:
based on the other object model representation, localizing content using normalized object model property files.

7. The method as claimed in claim 1, wherein performing, in the Flex operating environment, client side normalization comprises decoding the information into another information set conforming to another object model representation such that the model can be used generically by dialogs.

8. The method as claimed in claim 1, wherein the method is configured for producing and controlling a Graphical User Interface in a management system managing the data storage systems.

9. A system for use in managing object model communications, the system comprising:
a computer processor coupled to a memory, wherein the memory having stored thereon:
first logic requesting, in a Flex operating environment, an information set conforming to an object model representation from a data storage system;
second logic receiving, in the Flex operating environment, the information set conforming to the object model representation;
third logic performing, in the Flex operating environment, a client side normalization on the received information set to derive another information set conforming to another object model representation; and
based on the other object model representation, fourth logic generating a dialog that is sufficient for legacy and current object models of Flex and Java operating environments having network communications with data storage systems;
wherein requesting comprises issuing generic commands defining information required by corresponding views, decoding the generic commands and implementing the generic commands as non-generic commands such that the non-generic commands can retrieve the data from different protocols, different data storage systems and different Application Programming Interfaces (APIs).

10. The system as claimed in claim 9, wherein receiving, in the Flex operating environment, information set conforming to the object model representation in different formats selected from the group consisting of:
EMC Navisphere ("Navi") CIM/XML
standard CIM/XML
BAM/XML.

11. The system as claimed in claim 9, further comprising:
fifth logic providing communication between the Flex operating environment and a second discrete operating environment.

12. The system as claimed in claim 11, wherein the second operating environment is a Java operating environment.

13. The system as claimed in claim 11, further comprising:
sixth logic allowing routing information from storage system through second operating environment so that the information is received in the Flex operating environment.

14. The system as claimed in claim 9, further comprising:
based on the other object model representation, seventh logic localizing content using normalized object model property files.

15. The system as claimed in claim 9, wherein performing, in the Flex operating environment, client side normalization comprises decoding the information set into another information set conforming to another object model representation such that the model can be used generically by dialogs.

16. The system as claimed in claim 9, wherein the system is configured for producing and controlling a Graphical User Interface in a management system managing the data storage systems.

* * * * *